(12) United States Patent
Worrall

(10) Patent No.: US 7,944,157 B2
(45) Date of Patent: May 17, 2011

(54) DUAL RING DEDICATED DRIVE CONTROL SYSTEM FOR MEDIUM VOLTAGE VARIABLE FREQUENCY DRIVES

(75) Inventor: Stephen J Worrall, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 487 days.

(21) Appl. No.: 12/013,897

(22) Filed: Jan. 14, 2008

(65) Prior Publication Data

US 2009/0179600 A1 Jul. 16, 2009

(51) Int. Cl.
*H02P 5/00* (2006.01)
(52) U.S. Cl. .............. 318/66; 318/49; 318/67; 318/83
(58) Field of Classification Search .......... 318/49, 318/50, 51, 59, 66, 67, 68, 83, 93, 95, 111, 318/112, 113; 340/825.72, 854.6, 854.7, 340/286.02, 299, 307
See application file for complete search history.

(56) References Cited

U.S. PATENT DOCUMENTS

| | | | |
|---|---|---|---|
| 4,061,948 A * | 12/1977 | Lamparter | 318/87 |
| 4,289,997 A * | 9/1981 | Jung et al. | 318/113 |
| 4,918,365 A * | 4/1990 | Tanuma et al. | 318/685 |
| 5,420,485 A * | 5/1995 | Campbell, Jr. | 318/34 |
| 5,689,161 A * | 11/1997 | Fugere et al. | 318/563 |
| 5,988,846 A | 11/1999 | Flamm et al. | |
| 6,624,738 B2 * | 9/2003 | Bracklo et al. | 340/3.51 |
| 6,806,660 B2 * | 10/2004 | Fujisaki et al. | 318/113 |
| 7,119,505 B2 * | 10/2006 | Komaki et al. | 318/113 |
| 7,304,401 B2 * | 12/2007 | Enders et al. | 307/9.1 |
| 2007/0194728 A1 * | 8/2007 | Beifus | 318/66 |

FOREIGN PATENT DOCUMENTS

DE 42 42 438 C2 4/1995
DE 196 33 744 A1 8/1996

OTHER PUBLICATIONS

European Search Report for Appl. No. 09150445.6, dated May 20, 2009.

* cited by examiner

*Primary Examiner* — Bentsu Ro
*Assistant Examiner* — Thai Dinh
(74) *Attorney, Agent, or Firm* — Boyle Frederickson LLP; Alexander R. Kuszewski; John M. Miller

(57) ABSTRACT

The present invention provides a motor drive system that is substantially more robust than those of the prior art. Generally, the motor drive system provides a redundant communication topology with the drives, thereby greatly reducing the chance of failure by a fault in the drive-to-drive communication link. Specifically, the motor drive system includes a plurality of motor drives joined by a communication media. Each motor drive has a motor control circuit configured to control the speed of an electric motor and a media access control unit having two communication modules. Each communications module includes a transmitter and a receiver joined to the communications media. A set of routing switches in the media access control unit joins the communication modules to connect the motor drives in an independent primary and a secondary ring communicating data for controlling the motor drives.

25 Claims, 3 Drawing Sheets

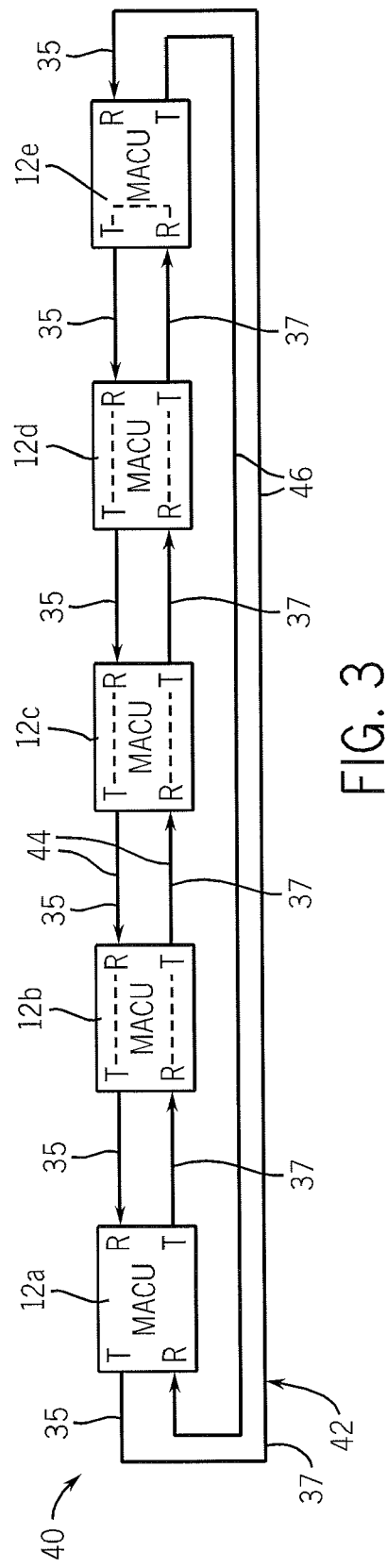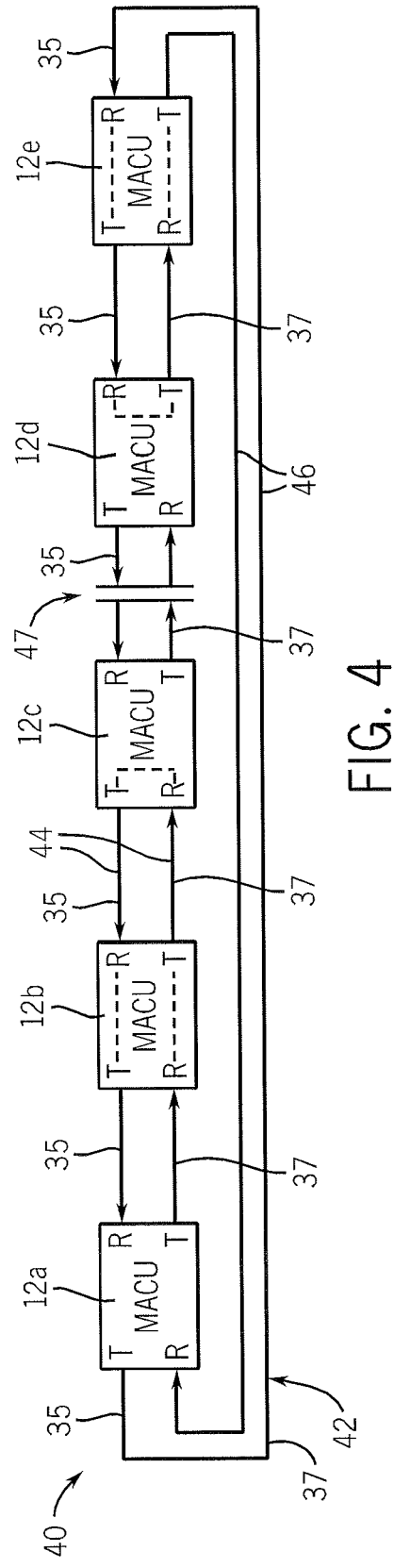

DUAL RING DEDICATED DRIVE CONTROL SYSTEM FOR MEDIUM VOLTAGE VARIABLE FREQUENCY DRIVES

STATEMENT REGARDING FEDERALLY SPONSORED RESEARCH OR DEVELOPMENT

N/A

CROSS REFERENCE TO RELATED APPLICATION

N/A

BACKGROUND OF THE INVENTION

The present invention relates generally to a control system for medium voltage variable frequency drives, and specifically to a control system for connecting multiple variable frequency drives together with a fiber optic communication ring.

In applications requiring multiple medium voltage variable frequency drives ("MV Drives"), there is typically a single drive designated as the main controlling drive. The remaining drives are then designated as followers. In such applications, typically the main controlling drive is responsible for the control of the overall speed (i.e., speed regulator), while the followers are responsible for assisting in providing the torque (i.e., torque regulators) to the motors in the system. In this arrangement, data is transferred from drive to drive over an industrial network such as, for example, DeviceNet, ControlNet or Industrial Ethernet. This network may also be shared with other controllers and drive combinations.

The main disadvantage experienced by such existing systems, is the creation of network latencies, that is, delays caused by network propagation delays and processing times in the system controllers and MV Drives. In critical applications, such as conveyors, such communication latency can create undesirable lateral or torsional vibrations. These vibrations can be amplified if they occur at certain natural frequencies. Another disadvantage of existing systems is that each MV Drive operates asynchronously from each other such that regulators add to the vibration in conveyor systems.

A secondary drive-to-drive communications link may be added to help alleviate the latencies of a single industrial network. However, such secondary links are typically over copper wire and therefore suffers from some of the same limitations as the industrial network such as lack of fault tolerance, excess latencies, limitations on distances, and the limitations of available bandwidth.

In the event of a break in communication with the controlling motor drives, either because of communication media failure or failure of the controlling drive itself, the system controller or PLC must we assign another drive to be the system controller or declare a fault in the system stopping all of the drives. Thus the motor drive system, even with a secondary drive-to-drive communication link, is susceptible to failure of (1) the PLC, (2) the main industrial control network, (3) the drive-to-drive communication link, and (4) the drive designated as the controlling drive.

SUMMARY OF THE INVENTION

The present invention provides a motor drive system that is substantially more resistant to failure. Generally the motor drive system provides a redundant communication topology with the drives, greatly reducing the chance of failure caused by a fault in the drive-to-drive communication link. Further, the invention designates one of the drives as a "Link Keeper" that can reconfigure the drive-to-drive communication link without intervention of the PLC. This provides integrity of the drive system even in the absence of communication with the PLC or failure of the PLC (1 and 2 above) and substantially reduces failure of the drive-to-drive communication link (3 above). The system readily adapts to optical fiber allowing extremely high-speed communication with low latency.

Specifically, the present invention provides a motor drive control system including a plurality of motor drives joined by communication media. Each motor drive has a motor control circuit for controlling the speed of an electric motor and a media access control unit (MACU). The MACU has a first communication module and a second communication module, each having a transmitter and a receiver joined to the communication media. A set of routing switches in the MACU joins the communication modules to connect the motor drives in an independent primary ring and a secondary ring communicating data for controlling the motor drives.

It is thus an object of the present invention to provide a communication system for a plurality of MV Drives that provides greater resistance to network failure.

In addition, the communication media may be constructed of optical fiber cables.

It is thus another object of the present invention to provide a communication system readily adaptable to optical fiber. Because the transmitters and receivers may be joined directly by routing switches, very little communication latency is experienced.

The dual communication ring of the present invention may alternatively be constructed of copper wiring at a reduced bandwidth and distance.

It is thus an object of the present invention to provide a low-cost alternative means of communication between the communication modules of the present invention.

The second communication module of all but one motor drive is coupled to the first communication module of an adjacent motor drive to form the primary ring.

It is thus yet another object of the present invention to provide simple method of establishing a redundant communication topologies that accommodate a daisy chaining connection system as well as breaks at any point in the chain.

The drive control system may have four routing switches: a first routing switch joining the transmitter of the first communication module with the receiver of the second communication module, a second routing switch joining the receiver of the first communication module with the transmitter of the second communication module, a third routing switch one shunting the transmitter and receiver of the first communication module and a fourth routing switch shunting the transmitter and receiver of the second communication module. During operation, the first and second routing switches may be closed or alternatively the third and fourth routing switches may be closed to change the topology of the primary and secondary ring.

It is thus an object of the invention to provide a simple switch network that may pass through or shunt data communications without the need for delaying computer processing of the data stream.

The motor drive control system may have one motor drive designated as a Link Keeper to (a) detect breaks in the primary ring upon the failure of the Link Keeper to receive a response to a communication from another motor drive and (b) provide instructions to other motor drives to reconfigure their routing switches detected.

It is thus yet another object of the present invention to provide a system where faults may be handled locally without the requirement of communication with the PLC.

Furthermore, the system of the present invention may be configured to include a redundant Link Keeper.

It is yet another object of the present invention to provide communication system that is less susceptible to failure of a single Link Keeper and thus which is inherently more reliable than a PLC moderated system where there is only one PLC.

These particular features and advantages may apply to only some embodiments falling within the claims and thus do not define the scope of the invention.

BRIEF DESCRIPTION OF THE DRAWINGS

FIG. 3 is a schematic illustration of the system of according to the present invention;

FIG. 4 is a schematic illustration of the system of FIG. 3 wherein a physical break is detected at a point in the system;

DETAILED DESCRIPTION OF THE PREFERRED EMBODIMENT

Figure 1:
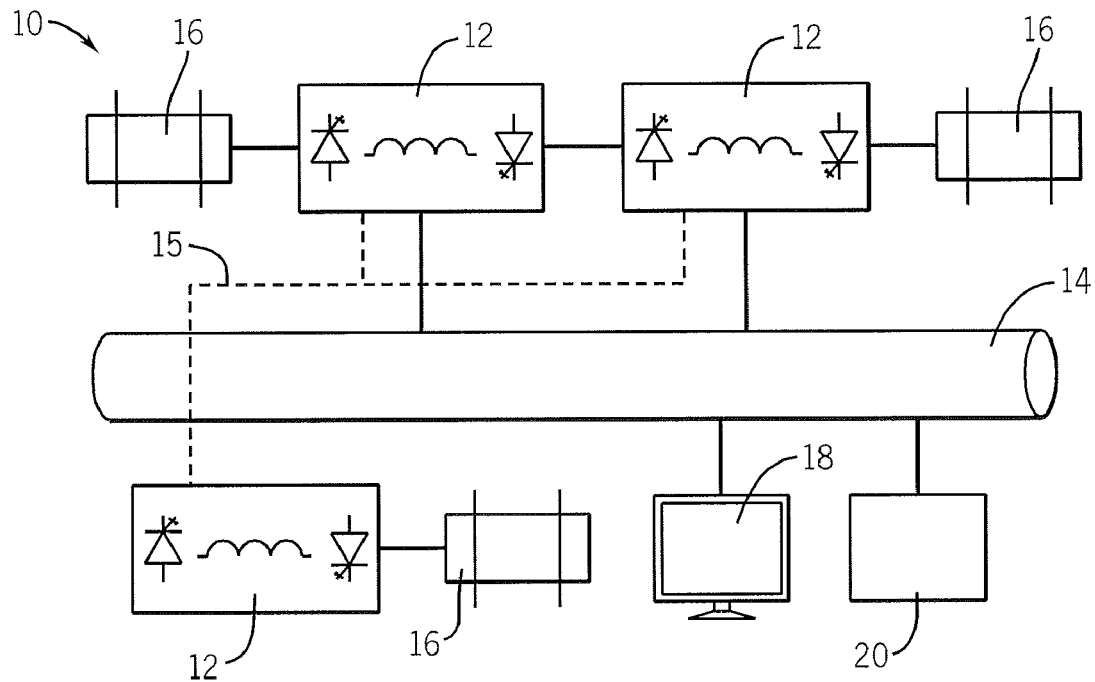
FIG. 1 is a schematic illustration of a multiple drive system of the prior art.

Turning now to the drawings and initially FIG. 1, a schematic illustration of a multiple drive system 10 of the type known in the prior art includes a plurality of drives 12 coupled to an industrial control network 14 such as, for example, ControlNet. Each drive 12 is in communication with a motor 16. In such systems 10, one of the drives 12 is typically designated as the main controlling drive while the remaining drives are designated as followers. In such applications, typically the main controlling drive is responsible for the control of the speed while the followers are configured to assist in providing torque to the motors 16 of the system.

Motion control data is transferred between the drives 12 by way of a dedicated drive-to-drive communication network 15, while configuration data for the drives 12 and for their communication on drive-to-drive communication network 15 is communicated over the industrial control network 14. The network 14 may be shared with other controllers and drives. The system 10 further comprises a system controller 20 such as, for example, a programmable logic controller (PLC). The system controller 20 is generally configured to manage the flow of data over the drive-to-drive communication network 15 and to communicate with other elements of the control system over the industrial control network 14. The system 10 of the prior art further includes an operator interface 18, which may comprise a computer adapted to allow a user to configure the system 10 for various applications.

In this system 10, each drive 12 can transfer data between the controlling drive and drive followers by going directly through the drive-to-drive communication network 15, however in the event of failure of this drive-to-drive communication network 15 or any drive 12 communication must be had with the system controller 22 by way of the industrial control network 14. A physical break in either the industrial control network 14 or drive-to-drive communication network 15 can cause the complete system to fault and thereby halt the process it is currently operating.

Figure 2:
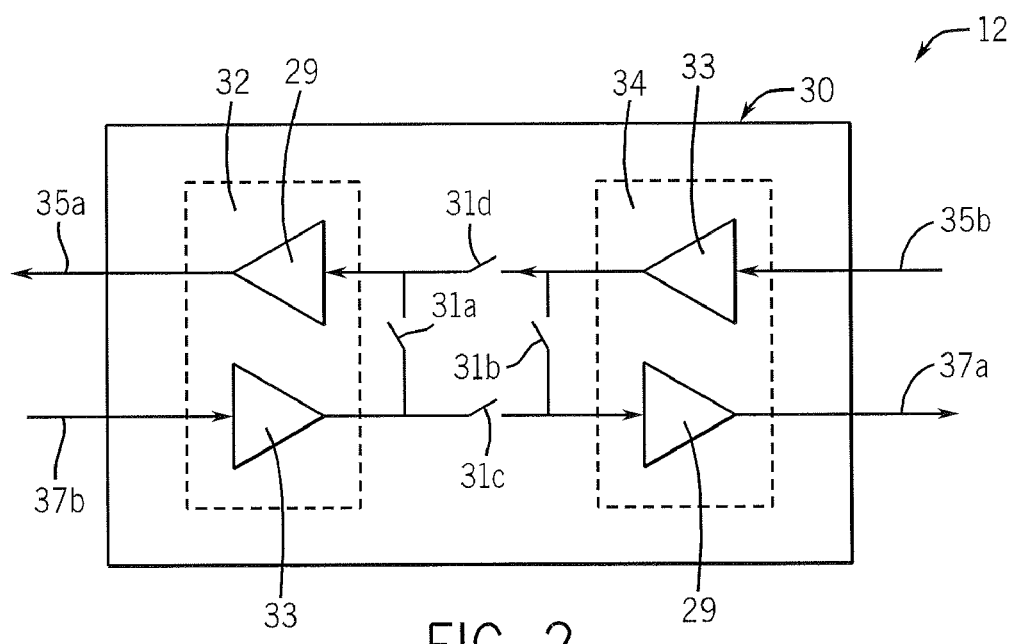
FIG. 2 is a schematic illustration of a Media Access Control Unit (MACU) of the type used in the present invention.

Turning now to FIG. 2, a schematic diagram of a Media Access Control Unit (MACU) 30 of the present invention includes a first communications module 32 and a second communications module 34. Each communication module 32 and 34 includes a transmitter 29 converting a outgoing electrical signals from the MACU 30 to optical signals to be received by first optical fiber 35a and 37a, respectively, and a receiver 33 receiving optical signals from optical fiber 35b and 37b respectively to convert them to electrical signals communicated with the MACU 30. The MACU 30 communicates with the MV Drives 12 of the present invention to communicate data therewith.

Each MACU 30 further includes a set of routing switches, 31a, 31b, 31c, and 31d. Switch 31d joins the output of receiver 33 in module 34 with the input of transmitter 29 in module 32. Switch 31c joins the output of receiver 33 in module 32 with the input of transmitter 29 in module 33. Switch 31b shunts the output of receiver 33 and the input of transmitter 29 in module 33. Likewise switch 31a shunts the output of receiver 33 and input of transmitter 29 in module 32. The switches 31 and receivers 33 and transmitters 29 may be directly connected devices, without the intermediary processing of computer circuitry and thus provide extremely low latency communication for example from fiber 35b to fiber 35a when switch 31d is closed. As will be understood the fibers 35 may be replaced by copper conductors for lower speed operation.

Now referring to FIGS. 2 and 3, and initially to FIG. 2, a plurality of MACUs 30 operably coupled to one another to form a dual ring network 42. In the system 40 of the present invention, the second communications module 34 of each MACU 30 (for example in drive 12b) is coupled to the first communications module 32 of an adjacent MACU 30 (for example 12c) for each of modules 12a, 12b, 12c, and 12d to form a primary ring 44. For each of these modules switches 31d and 31c are closed and switches 31a and 31b are open. For module 12e, switch 31a is closed and switch 31d and 31c are open terminating the primary ring 44.

The second communications module 34 of the module 12e is then coupled to the first communications module 32 of module 12a to create a secondary ring 46.

The electrical connections between each of the communication modules of the MACUs 30 are electrical switches contained in a field programmable gate array (FPGA) that will change operating conditions of the system 40 depending on the configuration of the link. These switches aid in reducing the costs of the device by eliminating the need for optical switches between fiber optic transmitters and receivers. The configuration of the switches may be set by data communicated on dual ring network 42 from a Link Keeper as will be described.

In normal operation of system 40, data flows around the primary ring 44, and the secondary ring 46 remains idle. When idle, the light source is removed by the MACU transmitters thereby creating a digital high level at the adjoining receiver. Preferably, system 40 initializes to this configuration automatically upon the application of power to the system 40.

The system 40 will preferably contain at least one MV Drive 12 configured to operate as the Link Keeper 12a and the remaining drives 12 will be designated as Link Followers 12b. In addition, one of the Link Followers 12b may be designated as a redundant Link Keeper 12c. The redundant Link Keeper 12c will generally operate as a Link Follower 12b unless a failure of the Link Keeper 12a is detected or the original Link Keeper 12a requests to transfer its role to a Link Follower 12b, upon which the redundant Link Keeper 12c will be configured to take over operation as the Link Keeper until commanded to transfer the role of Link Keeper by either the end user of the system controller.

In operation, the Link Keeper 12a controls of the state of the routing switches 31 in each of the Link followers 12b-e. Upon initialization the Link Keeper 12a will have all of its switches 31 open and will only use the second communications module 34 for transmitting and receiving messages between the Link followers 12b on the primary link at 44. All Link Followers 12b-f excluding the final Link Follower 12e will have switches 31c and 31d closed, effectively creating low latency repeaters along the primary ring 44. Depending on the type of fiber-optic used, this can allow a distance between drives in the order of kilometers. The last drive 12e will have switch 31a closed due to sensing an idle condition in the second communication module 34, thus closing the entire primary ring 44.

Turning now to FIG. 4, a break in the fiber optic cable 35 and/or 31 between modules 12c and 12d may occur compromising communication on the primary ring 44. In response to this break, the system 40 of the present invention is automatically reconfigured by the Link Keeper 12a or by devices 12d and 12e to communicate on the secondary ring 46 in order to reach the devices 12d, and 12e isolated by the break in the primary ring 44. A break in the primary ring 44 is preferably detected by monitoring the electrical level of the receiver in the adjacent devices 12c and 12d for an idle condition. Alternatively, a break in the ring is detected upon the failure to respond on the part of an adjacent Link Follower (e.g. 12d) to a Link Keeper's message. In this latter case the Link Keeper will turn on transmitter 37 in its second communication module 34 placing the secondary ring into an active state. Device 12e will detect this change in state and reconfigure its routing switches accordingly.

As shown in FIG. 4, when the physical break is between devices 12c and 12d, upon detection, the final drive 12e will open its switch 31a and close switches 31c and 31d to allow throughput of data from the secondary ring to isolated device 12d. In addition, it will then take its secondary ring transmitter out of the idle state. Upon detecting this, the Link Keeper will then use both communication modules 32 and 34 for messaging. As such, the fourth drive 12d will then assume the state of the last drive on the secondary ring 46 and open up switches 31c and 31d and close switch 31b. The third drive 12c now assumes the state of the last drive on the primary ring 44 will open switches 31c, and 31d and close switch 31a, thus completing the primary ring 44.

Figure 5:
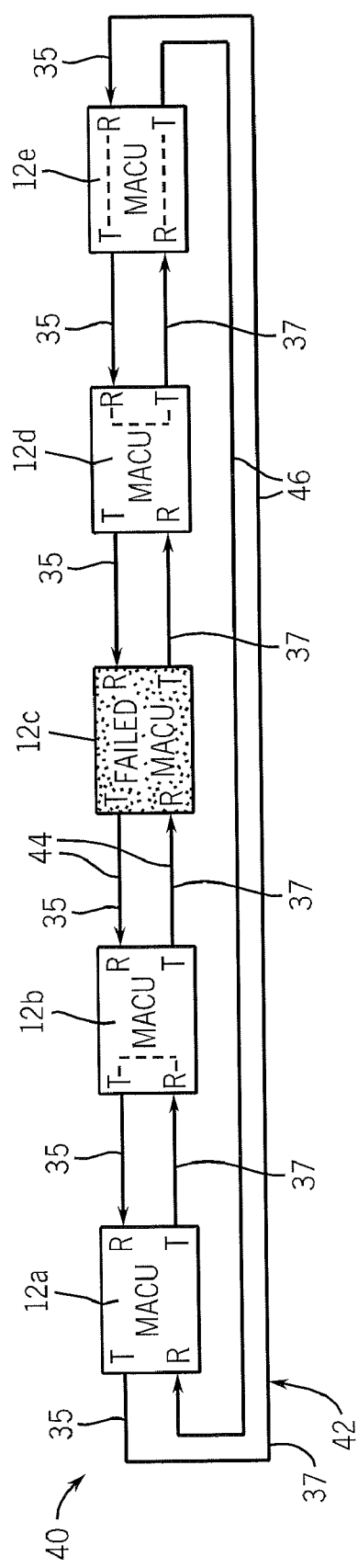
FIG. 5 is a schematic illustration of the system of FIGS. 3-4 demonstrating the reconfiguration of the system after a link follower failure.

Now referring to FIG. 5, after the failure of a MACU 30 the system 40 reconfigures itself as noted previously to communicate along the secondary ring 46 in order to bypass the failed MACU 30. In this case, the second drive 12b will assume the state of the last follower on the primary ring 44 and open switches 31c and 31d and close switch 31a. As before, the Link Keeper 12a can close switches 31c and 31d for peer to peer messaging if supported.

Figure 6:
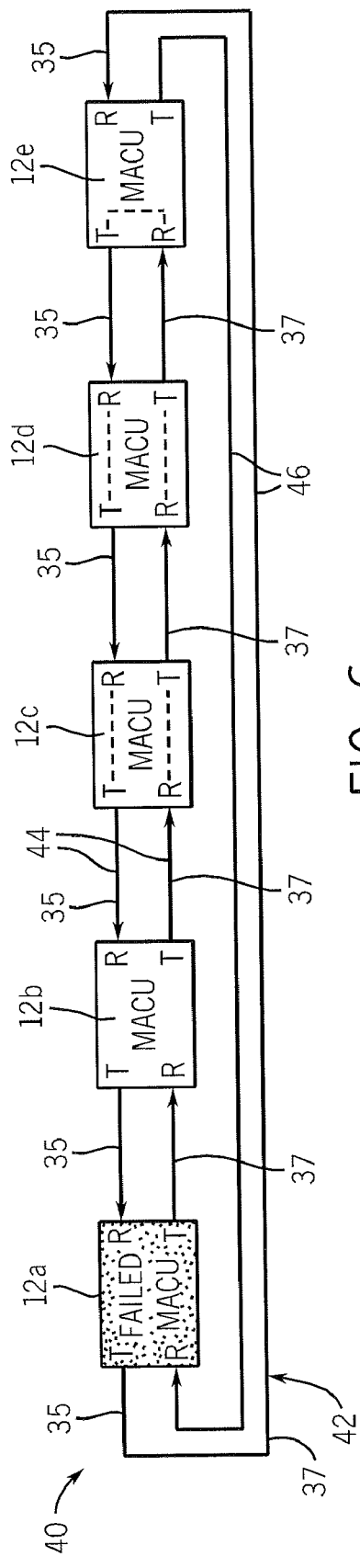
FIG. 6 is a schematic illustration of the system of FIGS. 3-5 demonstrating the reconfiguration of the system after a link keeper failure.

Turning now to FIG. 6, if there is a failure of the Link Keeper 12a, then assuming drive 12b was designated as the redundant Link Keeper 12c, the redundant Link Keeper 12b takes over the operations of the Link Keeper 12a automatically and the system 40 operates without interruption.

In the illustrated scenario, only the primary ring 44 will be utilized. If there are any additional breaks or failures in the network, the network will fail as it cannot be reconfigured to use the secondary ring 46. As such, a third optional communication module may be added to the system 40 as an external component. The addition of a third communication module would effectively disconnect the secondary ring 46 from the second communications module 34 in the original Link Keeper 12a and switch it to the first communication module of the new redundant Link Keeper 12c. Preferably, such a configuration would comprise an optical switch.

In addition, the system 40 the present invention may be configured to detect in the addition of a new drive 12 to the primary ring 44. Accordingly, the newly added drive 12 is provided with a location known to the system 40 and specifically to the Link Keeper 12a and the redundant Link Keeper 12b. During power up, each Link Follower will be assigned a node ID and Port ID depending on their respective location to the Link Keeper. Node IDs and Port IDs differ in that node IDs are used for addressing during messaging, and Port IDs are used for detecting the location of a physical break in the system 40. As such, Port IDs are fixed after power on configuration, while node IDs may change depending on a change in Link Keeper's 12a.

In addition, all configuring and reconfiguring of the system 40 of the present invention is accomplished by the drives 12 themselves preferably, this occurs automatically, thus eliminating the need for system controller such as, for example, a PLC, or through a set of commands coming from a system controller.

It is specifically intended that the present invention not be limited to the embodiments and illustrations contained herein, but include modified forms of those embodiments including portions of the embodiments and combinations of elements of different embodiments as come within the scope of the following claims.

I claim:

1. A motor drive control system comprising:
communication media including at least one network line;
a plurality of motor drives, each motor drive comprising:
(a) a motor control circuit for controlling an electric motor;
(b) a media access control unit (MACU) having:
(i) a first communication module and a second communication module, each having a transmitter and a receiver joined to the communication media,
(ii) a set of four routing switches joining the first and the second communication modules to connect the motor drives in an independent primary ring and a secondary ring communicating data for controlling the motor drives wherein a first routing switch joins the transmitter of the first communication module with the receiver of the second communication module, a second muting switch joins the receiver of the first communication module with the transmitter of the second communication module, a third routing switch shunts the transmitter and receiver of the first communication module and a fourth routing switch shunts the transmitter and receiver of the second communication module and wherein at least one of the primary ring and secondary ring include a segment joining a transmitter and receiver of one communication module.

2. The motor drive control system of claim 1 wherein the communication media is selected from the group consisting of optical fiber cable and copper wiring.

3. The motor drive control system of claim 1 wherein the second communication module of all but one motor drive is coupled to the first communication module of an adjacent motor drive to form the primary ring.

4. The drive control system of claim 1 wherein the first and second routing switches may be closed or alternatively at least one of the third and fourth routing switches may be closed to change a topology of the primary and secondary ring.

5. The motor drive control system of claim 1 wherein the MACU operates so that data transmission occurs on the primary ring and the secondary ring is idle unless a predetermined fault condition is detected.

6. The motor drive control system of claim 5 wherein the predetermined fault conditions are at least one of a physical break in the primary ring and a failed MACU.

7. The motor drive control system of claim 6 wherein the physical break in the primary ring is detected by monitoring a signal received at a receiver a communication module adjacent to the physical break.

8. The motor drive control system of claim 5 wherein upon detecting one of the predetermined fault conditions, the MACU of at least one motor drive will reconfigure itself to use the secondary ring.

9. The motor drive control system of claim 1 wherein one of the motor drives is designated as a Link Keeper and configured to initiate and synchronize data communication among the motor drives and the remaining motor drives are designated as Link Followers configured to respond to data communications received from the Link Keeper.

10. The motor drive control system of claim 9 wherein at least one motor drive is designated as a Link Keeper to
   (a) detect breaks in the primary ring upon the failure of the Link Keeper to receive a response to a communication from another motor drive and
   (b) provide instructions to other motor drives to reconfigure their routing switches detected.

11. The motor drive control system of claim 9 wherein one of the motor drives is designated as a Redundant Link Keeper to assume the duties of the Link Keeper if the Link keeper fails.

12. The motor drive control system of claim 11 wherein upon the failure of the Link Keeper, the Redundant Link Keeper is configured to act as the Link Keeper.

13. A dual ring motor drive control system for motor drives comprising:
   at least two motor drives, wherein each motor drive includes:
   a media access control unit (MACU) having a first and a second communications module each communications module having a transmitter and a receiver,
   a first routing switch joining the transmitter of the first communication module with the receiver of the second communication module,
   a second routing switch joining the receiver of the first communication module with the transmitter of the second communication module,
   a third routing switch shunting the transmitter and receiver of the first communication module, and
   a fourth routing switch shunting the transmitter and receiver of the second communication module wherein the second communications module of each motor drive is coupled to the first communications module of an adjacent motor drive by network lines to create a primary communication ring, and the second communication module of a last motor drive is coupled to the first communications module of a first motor drive by network lines to create a secondary communication ring.

14. The dual ring motor drive control system of claim 13 wherein the system comprises at least one motor drive that is designated the Link Keeper configured to instruct the other motor drives as to the state of their routing switches and the remaining motor drives are designated as Link Followers configured to respond to the communications from the Link Keeper in adjusting the state of their routing switches.

15. The dual ring motor drive control system of claim 13 wherein the secondary communication ring is not used for communication unless a fault condition is detected by the system.

16. The dual ring motor drive control system of claim 15 wherein the system is configured to automatically reconfigure itself upon the occurrence of the fault condition such that the communication is not interrupted.

17. The dual ring motor drive control system of claim 16 wherein the fault condition comprises at least one of a break in the fiber optic cable, a failed MACU, and a failed Link Keeper.

18. A method of handling fault conditions in a multiple motor drive network comprising the steps of:
   configuring a dual ring network by linking a plurality of adjacent motor drives to one another with network connections to create a primary ring;
   coupling a last motor drive to a first motor drive with network connections to create a secondary ring;
   detecting a predetermined fault condition; and
   reconfiguring the dual ring network to bypass the primary ring and utilize the secondary ring.

19. The method of claim 18 wherein the network connections are fiber optic cables and the predetermined fault condition comprises at least one of a physical break in the fiber optic cable of the primary ring and a failed motor drive.

20. The method of claim 18 further comprising the steps of
   a) assigning one of the motor drives to be a Link Keeper configured to instruct other motor drives in the reconfiguring of the dual ring network; and
   b) designating the remaining motor drives to be Link Followers configured to respond to the data communications received from the Link Keeper in reconfiguring the dual ring network.

21. A motor drive comprising:
   a motor control circuit for controlling an electric motor; and
   a media access control unit (MACU) having:
   a first communication module and a second communication module, each having a transmitter and a receiver, and
   a set of four routing switches joining the first and the second communication modules wherein a first routing switch joins the transmitter of the first communication module with the receiver of the second communication module, a second routing switch joins the receiver of the first communication module with the transmitter of the second communication module, a third routing switch shunts the transmitter and receiver of the first communication module and a fourth routing switch shunts the transmitter and receiver of the second communication module.

22. The motor drive of claim 21 wherein the set of four routing switches may be selectively configured in at least a first and a second operating mode wherein the first and second routing switches are closed and the third and fourth routing switches are opened in the first operating mode and wherein the first and second routing switches are open and at least one of the third and fourth routing switches are closed in the second operating mode.

23. The motor drive of claim 22 wherein the set of four routing switches are initially configured in one of the first and the second operating modes and wherein the MACU reconfigures the four routing switches to the other of the first and the second operating modes in response to a fault signal.

24. A motor drive comprising:

a motor control circuit for controlling an electric motor;

a first communication module having a transmitter and a receiver;

a second communication module having a transmitter and a receiver; and a plurality of routing switches selectively connecting each of the transmitters and the receivers of the first and second communication modules to at least one other of the transmitters and the receivers of the first and second communication modules wherein the routing switches may be selectively configured in at least a first and a second operating mode wherein, in a first operating mode, the routing switches connect the transmitter of the first communication module to the receiver of the second communication module and the transmitter of the second communication module to the receiver of the first communication module and wherein, in a second operating mode, the routing switches shunt the transmitter and the receiver of at least one of the first and second communication modules.

25. The motor drive of claim 24 wherein the routing switches are initially configured in one of the first and the second operating modes further comprising a media access control unit to reconfigure the four routing switches to the other of the first and the second operating modes in response to a fault signal.

* * * * *